D. DAMIANO.
TIDEWATER POWER PLANT.
APPLICATION FILED APR. 29, 1921.
1,438,812.
Patented Dec. 12, 1922.
2 SHEETS—SHEET 1.
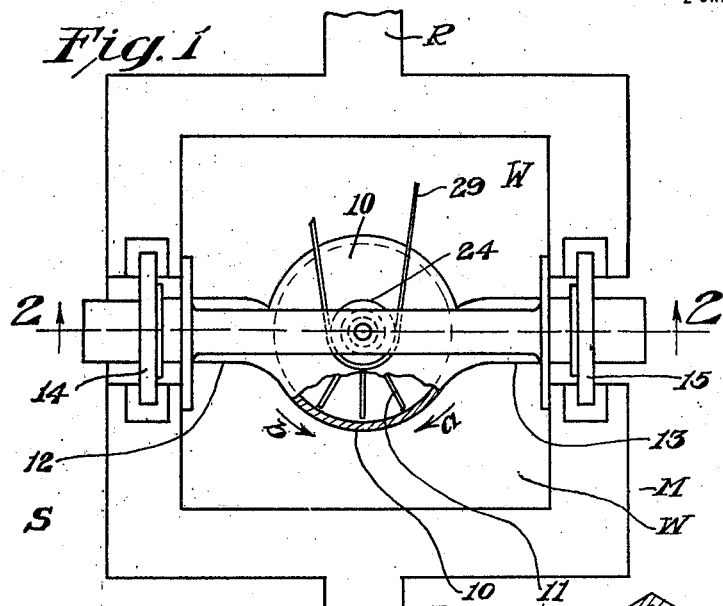
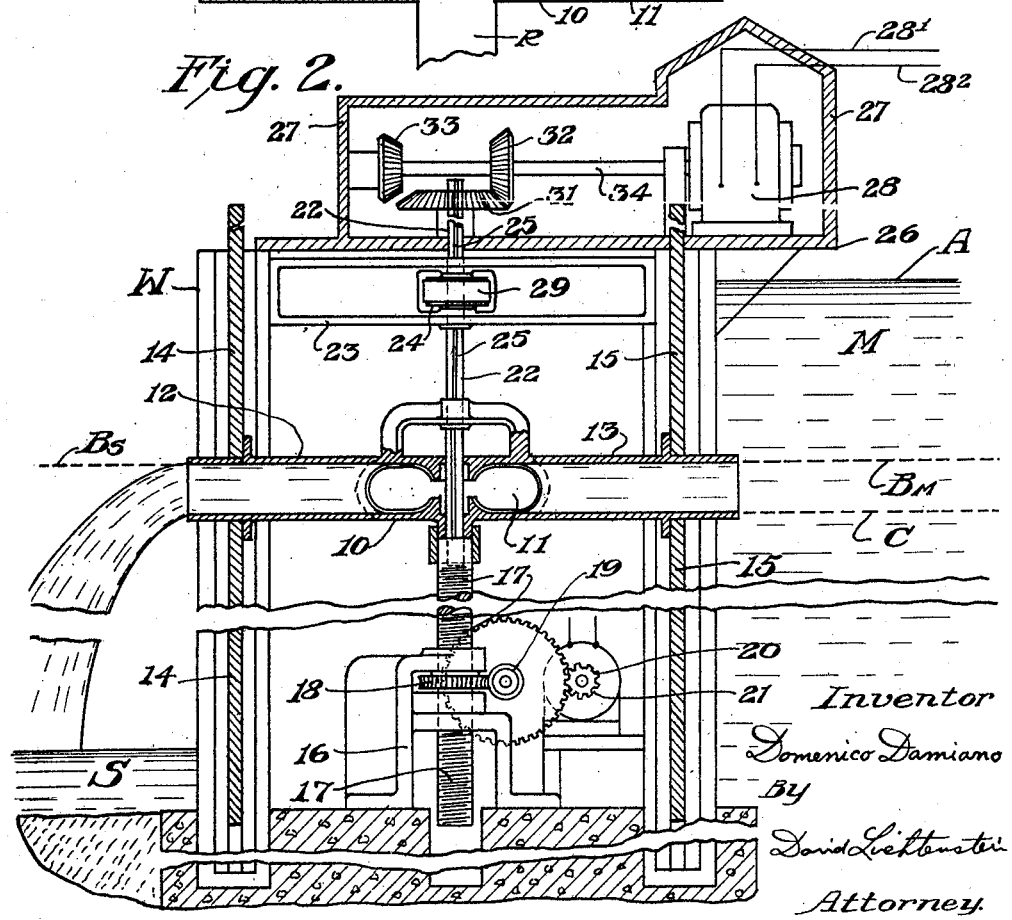
Inventor
Domenico Damiano
By
David Lichtenstein
Attorney.

D. DAMIANO.
TIDEWATER POWER PLANT.
APPLICATION FILED APR. 29, 1921.
1,438,812.
Patented Dec. 12, 1922.
2 SHEETS—SHEET 2.
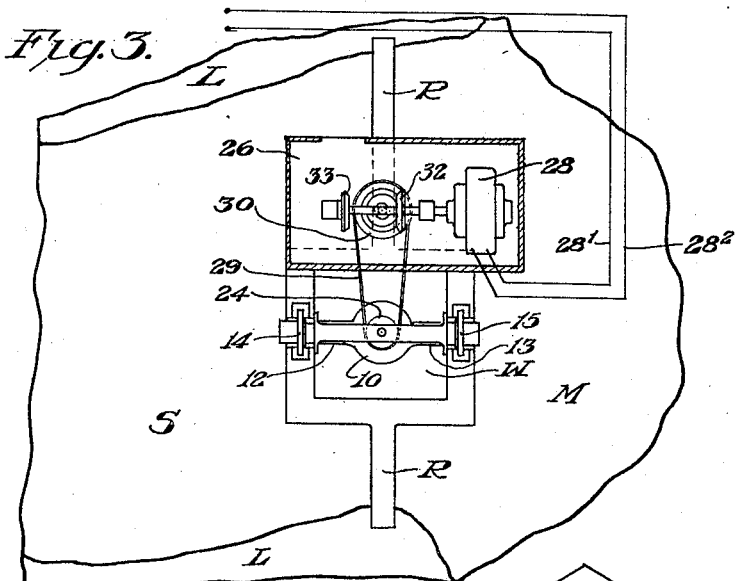
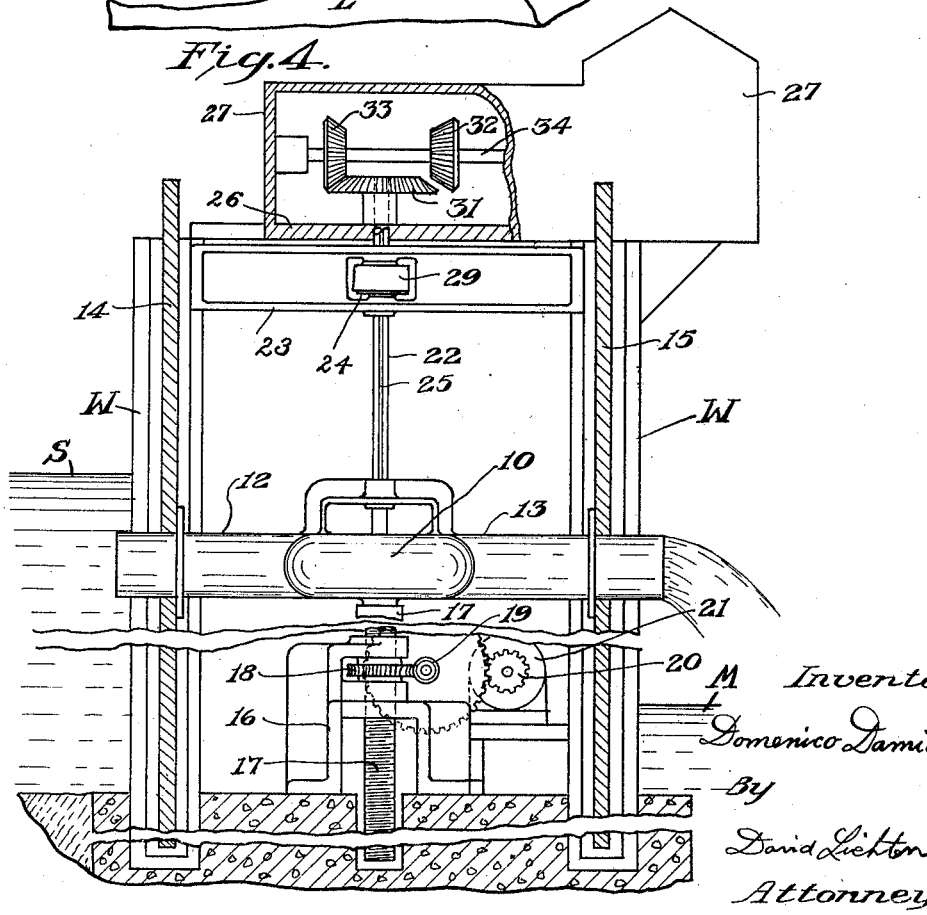
Inventor
Domenico Damiano
By
David Lichtenstein
Attorney Patented Dec. 12, 1922.

1,438,812

UNITED STATES PATENT OFFICE.

DOMENICO DAMIANO, OF BOSTON, MASSACHUSETTS.

TIDEWATER POWER PLANT.

Application filed April 29, 1921. Serial No. 465,409.

*To all whom it may concern:*

Be it known that I, DOMENICO DAMIANO, a subject of the King of Italy, and a resident of Boston, in the county of Suffolk and State of Massachusetts, have invented a new and useful Tidewater Power Plant, of which the following is a specification, reference being had to the accompanying two sheets of drawings, forming part thereof.

My invention relates to tide water power apparatus, which is designed to be alternately operated by the tide water on either side of a retaining wall housing said apparatus.

Another object of the invention is to provide a tide motor which is vertically adjusted in watertight well provided therefor in the retaining wall to set at any desired position in relation to the water levels on either side of said retaining wall for providing any desired working head for the tide motor and for yielding an operating range for said motor which enables same to operate under relatively high or low tide levels.

Other objects and advantages of the invention will be gathered from the description following herein and considered in connection with the accompanying drawings wherein the invention is shown embodied.

The terms employed herein are used in the generic and descriptive sense to designate the elements illustrated, and are therefore not primarily intended as terms of limitation.

In order to illustrate my invention, I have shown in the accompanying drawings an embodiment thereof, without being limited thereto, wherein:

Fig. 1 represents a plan view of a retaining wall provided with a well which houses the tide water power apparatus employed in my invention.

Fig. 2 represents a sectional view taken substantially on line 2—2 on Fig. 1;

Fig. 3 represents a schematic plan view showing my invention applied to a retaining wall which stretches across the mouth of a river or inlet dividing the same from the main body of water communicating therewith; and Fig. 4 represents a view similar to that shown in Fig. 2, but shows the flow of water through the plant reversed.

Like reference characters refer to like parts throughout the several views of the drawings.

The letter M represents the main body of water which is cut off from the subsidiary body of water S by the retaining wall R which stretches across from the land banks L, as shown in Fig. 3.

W represents a well which is preferably constructed of concrete and made watertight for housing the tide water motor 10 therein and the hereinafter described jacking mechanism employed therewith for elevating the same to assume any desired position in the well W. Said tide water motor 10 is preferably of the horizontal type comprising the water wheel 11, which is completely encased in a suitable casing that branches off into two oppositely disposed conduits 12 and 13 (Fig. 1), which conduits engage with the sliding gates 14 and 15 respectively of the well W through openings provided therefor, as shown in Fig. 2. Said well gates 14 and 15 are slidably set in the walls of the well W to ride up and down with the tide motor 10, serving thus as guides therefor, but they are designed to be watertight to prevent leakage into the well, as may be understood.

16 represents the motor jack supporting standard, which threadedly engages the motor jack-screw 17 which supports the motor 10 thereon and which is provided with the worm wheel 18, as shown in Fig. 2. Said worm wheel threadedly engages with the jack-screw 17 and is held in the standard 16 against movement up and down, but is rotatable therein and may be driven by the worm 19 which in turn is driven in either direction by the driving gear 20 of the reversing jacking motor 21 which may be controlled through a suitable switch (not shown) and which switch may be placed at a convenient spot outside of the well, if desired, to be available, without requiring the attendant to enter the well for the purpose.

The tide wheel 11 is provided with the vertical drive-shaft 22, which projects upwardly therefrom and which rotates therewith. Said drive-shaft is rotatably and slidably guided in the fixed bridge member 23 which carries the drive pulley 24; said drive pulley being provided with a key which fits a keyway 25 provided in said drive-shaft 22, as indicated in Fig. 2.

26 represents a platform which is provided the top of the well W and which may carry a housing 27 thereon for accommodating the generator 28 which is driven by the drive pulley 24 through the belt 29 driving the pulley 30. The latter pulley carries the generator drive gear 31, which engages with either of the generator clutch gears 32 or 33 which are slidably keyed to the generator shaft 34 to be engaged or disengaged from the gear 31, as the case may be, to correspond to the operating direction of the water wheel 11 of the tide motor. Said clutch gears may be coupled in any suitable manner to be mechanically or electrically operated, according as may be desired, to operate as a shifting clutch to bring one or the other gear into working engagement with the driving gear 31 to cause the generator 28 to rotate in the same direction, regardless of the direction of rotation of the water wheel 11 which operates said gear 31. The generator wires or cables $28^1$ and $28^2$ (Figs. 2 and 3) may be carried to any distant point to be there coupled with various electrical apparatus for utilization of the electrical energy generated by the within tide water apparatus.

Having thus described the parts of my invention in detail, the manner in which the same may be employed is as follows:

Assuming that for high tide the level of the main body of water M rises to the A position shown in Fig. 2, then the tide motor 10 should be raised to set below the tide level, as indicated in said figure, when it will be understood that the water will enter the conduit 13 that now acts as the head race for the tide motor. This water will drive the water wheel 11 in the direction of the arrow marked "a," Fig. 1, and will be discharged through the conduit 12 (now acting as the tail race) and will spill into the subsidiary body of water S. As the tide in M is lowered, the tide motor may be correspondingly lowered until such time perhaps as the levels of the water in M and S approximate each other, as indicated by the $B_m$ and $B_s$ positions shown in Fig. 2, when the pressures on either side of the tide motor become neutralized and no driving effect to the water wheel results therefrom.

That condition would continue until the tide in M would drop sufficiently below the level of S, for example to the C position indicated in Fig. 2. The pressure on the S side would then prevail and the water would enter this time from S through the conduit 12 (now the head race) and would drive the water wheel in the direction of the arrow marked "b" in Fig. 1, discharging through the conduit 13 (now the tail race) into M, as shown in Fig. 4. The water motor 10 may be lowered through the jacking mechanism to keep the desired head on the S side and to set above the level in M, as may be understood and as indicated in Fig. 4.

Thus, according as may desired, the tide motor may be raised or lowered in the well to set in the desired position for passing the water therethrough from one side of the retaining wall to the other; and according to the direction of rotation of the tide motor, one or the other of the gears 32 and 33 should be engaged to cause the generator to turn always in the same direction and regardless of the direction of rotation of the tide motor.

It will here be noted that while I have shown in the drawings the well W positioned intermediate along the retaining wall R, between the land banks, said well may be set close to the land so that the housing 28 may be set on a wharf or on the land proper.

Thus it will be noted that the within plant may be operated in accordance with the levels prevailing on either side of the retaining wall, and that the plant may be substantially continuously operated to generate power which may be made available for application in connection with the many uses for which power is required.

While I have herein shown and described a specific, practical embodiment of my invention, it is to be understood that this showing is merely by way of illustrating the principles of the invention, and I do not confine the invention to such illustration except in so far as the appended claims impart.

Having thus described my invention in detail, what I claim as new is:

1. A tide water power plant comprising means forming a watertight well with sliding gates permanently sealing said well to prevent the entry of water therein, a tide motor in said well having its inlet and discharge conduits extending through said sliding gates to the outer sides of said well, and stationary means in said well for supporting said tide motor, said means being adjustable for raising and lowering said tide motor in said well.

2. A tide motor power plant comprising a water tight well positioned between two separated bodies of water, said well having sliding gates in the sides thereof permanently sealing said well from the entry of water therein, a tide motor in said well having inlet and discharge conduits extending through said sliding gates to the outer sides of the well, means positioned permanently on the bottom of the well for raising and lowering the tide motor in the well 3. A tide water power plant comprising means forming a water tight well positioned between two bodies of water of different heads, sliding gates in the sides of said well permanently sealing said well from the entry of water therein, a tide motor in said well having its inlet and exhaust conduits extending through the sliding gates to the outer sides of the well, and a jack mounted in the bottom of the well for raising and lowering the tide motor within the well.

4. A tide water power plant comprising a water tight well having sliding gates permanently sealing said well from the entry of water therein, a tide motor having its inlet and exhaust conduits extending through the sliding gates to the outer sides of the well, means adapting said sliding gates to move with the up and down movement of the motor, means for moving said motor up and down in the well, said means being permanently mounted in the bottom of the well, and means for transmitting the motive power generated by the tide motor.

5. A tide water power plant comprising a water tight well positioned between two bodies of water and having sliding gates in the sides thereof permanently sealing said well from the entry of water therein, a horizontally disposed tide motor in said well having inlet and exhaust conduits extending through the sliding gates to the outer sides of the well, means adapting said sliding gates to ride up and down simultaneously with the raising and lowering of the tide motor, means for raising and lowering the tide motor in the well, said means being permanently fixed at the bottom of the well, and means for transmitting the motive power generated by the power tide motor to an outside source.

6. A tide water power plant comprising a retaining wall between two separated bodies of water of different heads, a dry well within said retaining wall having sliding gates forming the sides of said wall and permanently sealing the dry well from entry of water therein, a tide motor within said well and having its inlet and exhaust conduits extending through the sliding gates to the outer sides of the retaining wall, means adapting said tide motor and sliding gates for simultaneous movement, means for raising and lowering said tide motor within said well, said means being permanently positioned on the bottom of the well, and means for transmitting the motive power from the tide motor to a point externally of the well.

7. A tide water power plant comprising means forming a well provided with sliding gates permanently sealing said well, a tide motor in said well and having its inlet and discharge conduits open to the outer sides of the well through said sliding gates, a threaded shaft supporting said motor, means to rotate said shaft whereby the motor is raised and lowered and the gates are moved simultaneously with the tide motor.

In testimony whereof, I hereunto affix my signature this 27th day of April, 1921.

DOMENICO DAMIANO.

Witness:
DAVID LICHTENSTEIN.